Aug. 22, 1967 W. S. SADLER 3,337,684

TELEVISION MONITORING APPARATUS HAVING DUAL FUNCTION AS PICTURE MONITOR AND OSCILLOSCOPE

Filed Feb. 23, 1965

INVENTOR.
WILLIAM S. SADLER

BY Frederick E. Lange

ATTORNEY

United States Patent Office 3,337,684
Patented Aug. 22, 1967

3,337,684

TELEVISION MONITORING APPARATUS HAVING DUAL FUNCTION AS PICTURE MONITOR AND OSCILLOSCOPE

William S. Sadler, St. Paul, Minn., assignor, by mesne assignments, to Ball Brothers Company Incorporated, Muncie, Ind., a corporation of Indiana Filed Feb. 23, 1965, Ser. No. 434,367
8 Claims. (Cl. 178—7.5)

The present invention is concerned with television monitoring apparatus and more particularly with apparatus in which a single cathode ray tube is employed for both monitoring the video picture and monitoring the wave form of the video signal.

It has been the practice in connection with the monitoring of the video signal, particularly in connection with television transmitting stations, to employ one cathode ray tube designed to function as a kinescope to monitor the video picture and another cathode ray tube designed to function as an oscilloscope, to monitor the wave form of the video signal. This has resulted in a very expensive piece of apparatus since both the tube employed as the kinescope to monitor the picture signal and that employed as the oscilloscope, along with the circuit components used, must be of very high quality.

It is the general object of the present invention to employ a single cathode ray tube for both monitoring the video picture and also for monitoring the video signal. Broadly, I accomplish this by providing apparatus in which, when the picture is being monitored, the horizontal and vertical deflection means are connected to the horizontal and vertical deflection voltages derived from the synchronizing pulses and when the wave form of the video signal is being monitored, the incoming video signal is connected to the vertical deflection means and a source of voltage of predetermined frequency is connected to the horizontal deflection means. More specifically, in one form of my apparatus, I provide two vertical deflection means, one an electromagnetic type to which the vertical deflection voltage is applied when the picture is being monitored and an electrostatic vertical deflection means to which the video signal is applied when the wave form of the video signal is being monitored.

In a still further version of my device, I employ electromagnetic deflection means for both vertical and horizontal deflection when the video picture is being monitored and electrostatic deflection means for both horizontal and vertical deflection when the wave form of the video signal is being monitored.

It is a further object of my present invention to provide a monitor arrangement in which a cathode ray tube of the kinescope type may be used not only for monitoring a video picture but for also monitoring the wave form of any desired signal.

A further object of the invention is to provide such an arrangement in which there are scale lines visible when the tube is being used as an oscilloscope but invisible when the tube is being used as a video monitor.

A still further object of the invention is to provide an arrangement of the type discussed in which the voltage applied to the screen of the cathode ray tube is automatically reduced when a wave form is being analyzed in order to avoid injuring the screen of the cathode ray tube and to increase the sensitivity of the deflection means.

Further objects of the invention will be apparent from a consideration of the accompanying specification, claims and drawing of which:

Figures 1, 2, 3, 4:
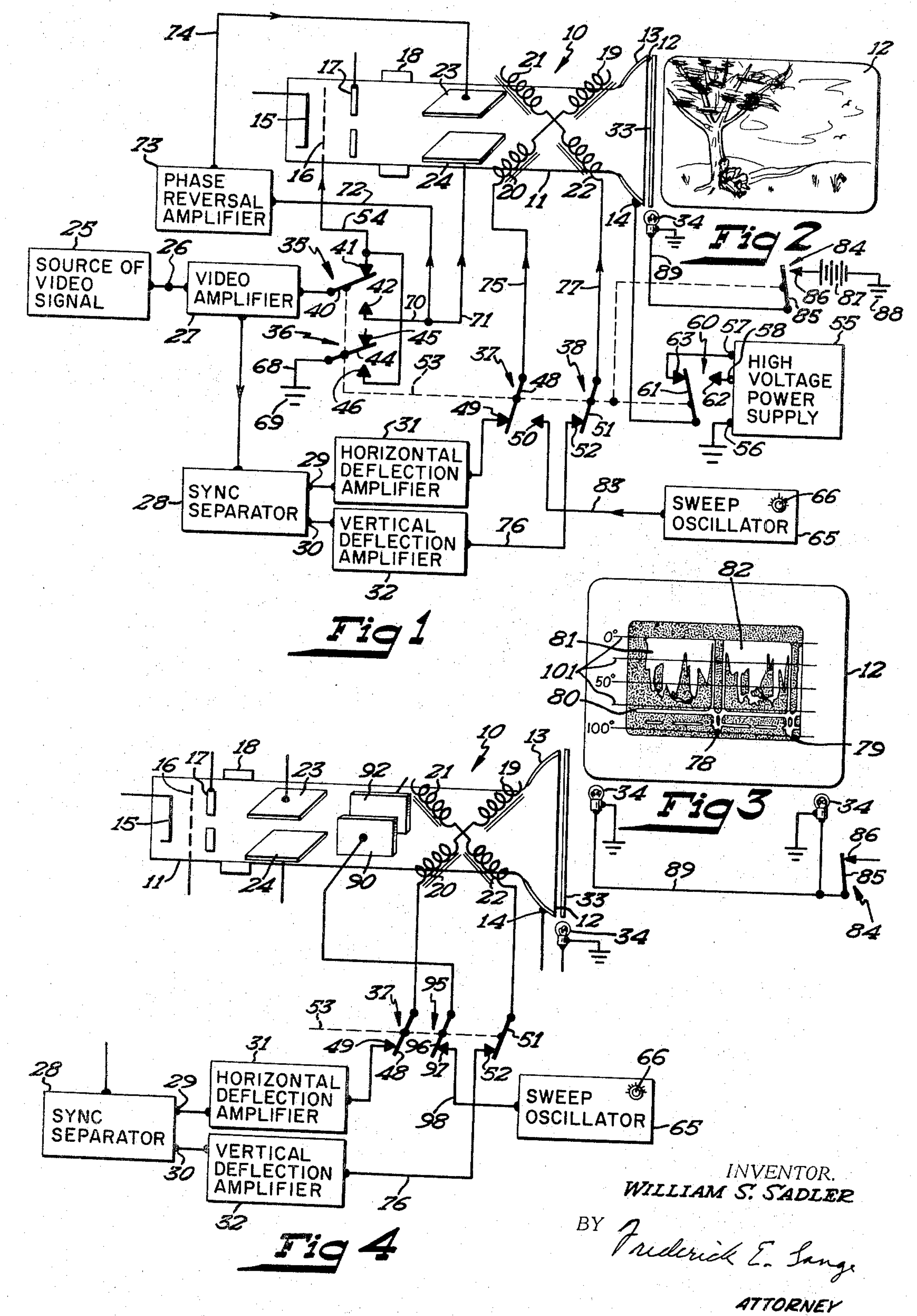
FIGURE 1 is a schematic view of my improved television monitoring apparatus.
FIGURE 2 is a view of the screen of the cathode ray tube when it is being used to monitor the video picture.
FIGURE 3 is a view of the same screen when it is being used to monitor the wave form of the video signal.
FIGURE 4 is a view of the portion of a television monitor apparatus of modified form.

Referring to FIGURE 1, a cathode ray tube is designated generally by the numeral 10. The cathode ray tube 10 has a tubular envelope 11 and a screen 12 having a luminescent coating on the interior surface thereof. The screen 12 which may be of rectangular form is connected to the tubular portion 11 by a conical portion 13 which is preferably coated on the inside with a conductive material to provide an anode to which connection is made at terminal 14. Since the tube is to be used as a video picture monitor, the luminescent coating on the screen 12 is preferably of the type which gives a white light rather than a green light, when exposed to a cathode ray beam. A typical type of such a coating is that known commercially as a P4 phosphor coating.

The cathode ray tube is provided with a conventional means for producing a cathode ray beam. This includes a cathode 15 which may be suitably heated to be electron emissive. The electrons leaving the surface of cathode 15 are controlled by a control grid 16 through which the stream of electrons passes. After leaving the control grid 16, the electrons pass through an accelerating grid 17 which may be connected in a conventional manner to a source of potential sufficiently high to cause acceleration of the electron stream. The electron stream is then concentrated by an electromagnetic focusing coil 18 which is effective to concentrate the beam of electrons so that when it engages the screen 12, it is in the form of a point. Before engaging the screen 12, the beam of electrons is subjected to the effect of horizontal deflection coils 19 and 20 and vertical deflection coils 21 and 22. These coils, while shown as extending diagonally for purposes of illustration, are actually mounted about the outer surface of the tube 11, the horizontal deflection coils 21 and 22 being disposed above and below the tubes and the vertical deflection coils 19 and 20 being disposed horizontally on opposite sides of the tube. The effect of a current flowing through the horizontal deflection coils 19 and 20 is to tend to cause the beam to move to one side or the other on the screen 12 depending upon the direction of the current flow. When current flows through the vertical deflection coils 21 and 22, the beam is deflected vertically in a direction depending upon the direction of current flow.

The anode and screen are maintained at a relatively high voltage with respect to the cathode by means of a voltage derived from a high voltage power supply 55. The power supply has a ground terminal 56, a high voltage terminal 57 which may, for example, be at 18,000 volts with respect to ground, and a lower voltage terminal 58 which may be at approximately half the potential of high voltage terminal 57.

The structure of the tube described to date is relatively conventional and need not be explained in further detail. For example, as will be apparent from the subject description, I have in each case shown only one connection to the deflection coils and have not shown the complete circuit therethrough, this being old and well known.

In one form of my apparatus, I also employ electrostatic deflecting means for use when the cathode ray tube is used for mintoring the wave form of the incoming signal. This electrostatic deflection means comprises a pair of plates 23 and 24 disposed within the tube and closely adjacent to the beam. The effect of these plates, when a voltage is applied thereto, is to cause the beam to deflect upwardly or downwardly in a vertical direction, depending upon the polarity of the voltage applied between the plates. The purpose and operation of these electrostatic plates 23 and 24 will be described in more detail later.

In connection with the use of the tube as an oscilloscope, I also provide an edge-lighted, calibrated graticule in the form of a panel 33. As will be explained in connection with FIGURE 3, this panel has horizontal scale lines etched therein, these scale lines normally not being visible except when the panel is edge lighted. For the purpose of edge lighting the panel, I provide a plurality of electric lamps 34 which are disposed along one edge of the panel, such as the bottom. When the electric lamps 34 are not energized, the panel appears to be completely transparent and serves merely as a safety panel, such as conventionally employed in front of the luminescent screen 12.

The tube which has been described is, with the exception of the electrostatic plates 23 and 24 and the safety panel 33, a conventional kinescope. The tube is designed to monitor the video picture as received from a source of video signal, schematically designated by the reference numeral 25. This source may be a receiver or a camera, for example. The output of the video signal source 25 is connected through a suitable plug connector 26 to the input of a video amplifier 27. Connected to an intermediate stage of the video amplifier 27 is a sync separator 28 which is effective in the usual manner, such as by clipping, to separate out the horizontal and vertical synchronizing signals from the composite signal passing through the video amplifier 27. The sync separator 28 has two output terminals 29 and 30, output terminal 29 having a voltage appearing thereon which is indicative of the horizontal deflection signal and output terminal 30 having a voltage thereon which is dependent upon the vertical deflection signal. The output terminal 29 is connected to a horizontal deflection amplifier 31 having an output in the form of a sawtooth wave form whose frequency is dependent upon the frequency of the horizontal synchronizing pulses. The output terminal 30 of the sync separator 28 is connected to a vertical deflection amplifier 32 and the output of this vertical deflection amplifier is in the form of a sawtooth wave whose frequency is dependent upon the frequency of the vertical synchronizing signals.

The output of video amplifier 27, which corresponds to the amplified output of the video signal source 25, and the outputs of the horizontal deflection amplifier 31 and the vertical deflection amplifier 32 are designed to be connected through the control grid 16, the horizontal deflection coils 19 and 20, and the vertical deflection coils 21 and 22 of the tube 10. The connections of these voltage sources to the various elements of tube 10 and the selection of the voltage from power supply 55 to be applied to anode connection 14 are controlled by a plurality of switches 35, 36, 37, 38, 60 and 84. These switches are shown for purposes of illustration as each having a movable contact member and are designed so as to be operated simultaneously. The switch 35 contains a movable contact member 40 movable between two fixed contacts 41 and 42. The switch 36 comprises a movable contact member 44 movable between a "dead" contact 45 and a fixed contact 46. The switch 37 comprises a movable switch contact member 48 movable between fixed switch contacts 49 and 50. The switch 38 has a switch contact member 51 movable into and out of engagement with a fixed contact 52. The switch 60 has a movable contact member 61 movable between fixed contacts 62 and 63. The switch 84 has a movable contact member 85 movable into engagement with a fixed contact member 86.

As schematically shown in the drawing, switch contact members 40, 44, 48, 51, 61 and 85 are shown schematically as being connected together by a suitable mechanical connection shown by dotted line 53. It is to be understood, however, that this is solely for purposes of illustration and that the switches may be actuated simultaneously in any other suitable manner. For example, the switches 35 through 38, 60 and 84 may be switch contacts of one or more relays which are energized under the control of a master selector switch.

With the switches 35 through 38 in the position shown, the output of video amplifier 27 is connected through switch contact 40, fixed contact 41, and a conductor 54 to the control grid 16. The output of the horizontal deflection amplifier 31 is connected through contact 49, switch contact 48 and conductor 75 to the horizontal deflection coils 19 and 20. When the switches are in these positions, the output of the vertical deflection amplifier 32 is connected through conductor 76, switch contact 52, switch contact 51 and conductor 77 to the vertical deflection coils 21 and 22. Also with the switches in these positions, the high voltage terminal of power supply 55 is connected through fixed contact 63 and movable contact member 61 to anode terminal 14. It is to be understood that the remote ends of the deflection coils 19 and 21 are either connected to ground or to some point which varies in potential with respect to the output terminals of the horizontal and vertical deflection amplifiers. For example, as will be described in connection with electrostatic plates 23 and 24, the outputs of the horizontal and vertical deflection amplifiers 31 and 32 may be connected to phase reversal amplifiers, the outputs of which are in turn connected to the remote ends of coils 19 and 21. Such expedients are, however, well known in the art and the particular manner in which the horizontal and vertical deflection coils are energized from the horizontal and vertical deflection amplifiers forms no part, by itself, of the present invention.

With the anode connected to the high voltage terminal 57 of the power supply and with the outputs of the video amplifier connected to the control grid 16 and the outputs of horizontal and vertical deflection amplifier coils 31 and 32 connected to the horizontal and vertical deflection coils, respectively, the cathode ray tube 10 will act as the usual video picture monitor to produce upon the screen 12 a picture corresponding to that being transmitted or received. In FIGURE 2, I have shown schematically a picture such as would appear on the screen 12 with the elements connected as has just been described. Since the switch contact 85, to which the electric lamps 34 are connected, is not in engagement with any contact, these lamps will be unenergized and the safety panel 33 will appear transparent and the lines on the safety panel will be substantially invisible, thus not affecting the picture being viewed.

A cathode ray tube of the kinescope type such as used for monitoring is of very high quality and the various circuit components used therewith are such as to give a very high quality of reproduction. It is obvious that if the tube 10 is to accurately monitor the system, the tube must be able to accommodate itself to any variations in the video signal and must be able to reproduce the video picture more accurately than any cathode ray tube in any normal receiving set. With the present invention, it is possible to utilize the same tube and many of the circuit components associated therewith for also monitoring the wave form of the video signal. As pointed out above, this is normally done by providing a separate cathode ray tube designed to operate as an oscilloscope. Due to the very high quality of signal reproduction which is desired, these oscilloscopes are very costly and add substantially to the cost of the monitoring equipment required in a typical broadcasting station. With the present invention, I make it possible to utilize the high quality of the components and circuitry available in the typical video monitor to obtain an accurate monitoring of the wave form of the video signal.

As part of the equipment which I use when the tube 10 is operated as an oscilloscope, I provide a sweep oscillator 65 which is designed to produce a sawtooth wave form of adjustable frequency. To indicate that the frequency is adjustable, I have shown an adjusting knob 66.

Let it now be assumed that all of the movable switch contacts of the various switches shown are moved to their other switch controlling position. In other words, movable switch contact members 40, 44, 48, 51, 61 and 85 are moved so that movable contact members 40, 44, 48, 61 and 85 are in engagement with contacts 42, 46, 50, 63 and 86, respectively. At the same time, switch blades 40, 48, 51 and 61 are moved out of engagement with contacts 41, 49, 52 and 62, respectively.

The effect of moving switch blades 40 and 44 to their new position is that the control grid 16 will no longer be connected to the output of the video amplifier 27 but rather will be connected to a fixed voltage point such as ground. The connection of grid 16 to ground can be traced through conductors 54 and 67, fixed contact 46, movable contact 44, and conductor 68 to ground at 69.

The movement of movable switch member 48 from engagement with contact 49 into engagement with fixed contact 50 results in the output of the sweep oscillator 65 being applied to the horizontal deflection coils 19 and 20. It will be noted that upon movement of movable switch member 48 into engagement with contact 50, a circuit is established from the output terminal of the sweep oscillator through conductors 83, contact 50, movable contact member 48, and conductor 75 to the horizontal deflection coils 19 and 20. As previously pointed out, while no connection is shown to the far end of coil 19, it is to be understood that the remote end of this coil will either be connected to ground or some point which varies in potential with respect to the output terminal of the sweep oscillator 65 so that the sweep voltage will appear across coils 19 and 20. The movement of movable switch member 40 from engagement with contact 41 to engagement with contact 42 results in the output of the video amplifier being transferred from the control grid 16 (as previously mentioned) to the electrostatic vertical deflection plates 23 and 24. It will be noted that a circuit is established from the output of video amplifier 27 through movable contact member 40, fixed contact 42 and conductors 70 and 71 to the electrostatic plate 24. A circuit is also established from conductor 70 through conductor 72, a phase reversal amplifier 73, and conductor 74 to the other electrostatic vertical deflection plate 23. The purpose of the phase reversal amplifier 73 is to insure that the potential applied to plate 23 will be 180 degrees out of phase with the potential applied to plate 24.

By reason of the connections just traced, the composite video voltage is applied between the electrostatic plates 23 and 24 so that the beam is now deflected in accordance with the variations in magnitude of the video signal. It is desirable to employ the electrostatic plates 23 and 24 instead of the vertical deflection coils since the frequencies now being applied to the vertical deflection means are extremely high and it is very difficult to obtain electromagnetic deflection coils which would be capable of handling the very high frequencies involved. The video signal applied to plates 23 and 24 not only contains the vertical synchronizing pulses which are of relatively low frequency but also the horizontal synchronizing pulses which are of much higher frequency and the picture information itself which is of extremely high frequency. It is possible to employ the horizontal electromagnetic deflection coils 19 and 20 because the frequency of the sweep voltage from sweep oscillator 65 is relatively low as compared with that of the video picture signal.

While the electromagnetic deflection coils 19 and 20 and 21 and 22, and the electrostatic deflection plates 23 and 24 have been shown as displaced a substantial distance from each other, this is only for purposes of the schematic drawing. It is to be understood that in the usual manner, the electromagnetic deflection coils 19 through 22 will be placed as close as possible to the conical portion 13 of the tube 10. Furthermore, the electrostatic plates 23 and 24, while located within the tube, will normally be located behind the coils. The reason for this is that otherwise, the beam when deflected by the electromagnetic deflection coils would tend to engage the plates 23 and 24 and cause a "plate shadow." Furthermore, by placing the plates 23 and 24 slightly further away from the screen 12 than the electromagnetic deflecting coils 19 through 22, it is possible to get an adequate amount of deflection without the use of excessively high voltages. Normally, it is necessary to apply extremely high voltages to electrostatic deflection plates to get an appreciable amount of deflection of the beam. Because of the greater distance of the electrostatic deflection plates 23 and 24 and the screen, the same angular displacement of the beam by the electrostatic plates 23 and 24 will result in a greater movement of the beam than if the electrostatic plates were closer to the screen.

Another reason why it is possible to use electrostatic plates 23 and 24 without the use of excessively high voltages applied thereto is that only a portion of the screen 12 is utilized when the tube 10 is being used as an oscilloscope. This is shown in FIGURE 3, where there is depicted a composite video signal with the horizontal blanking and synchronizing pulses shown as extending downwardly. It will be noted that the overall display occupies only a small portion of the total area of the screen 12. The horizontal synchronizing pulses are indicated by the reference numerals 78 and 79. The white line 80 indicates the blanking or pedestal level and the white areas 81 the video picture information.

The movement of contact member 61 from engagement with contact 63 to engagement with contact 62 results in a much smaller voltage being applied to the anode 13 and the screen 12. The movement of movable contact 61 into engagement with fixed contact 62 results in the disconnection of the anode 14 from the high voltage terminal 57 and its connection to the low voltage terminal 58. As pointed out above, whereas the potential of terminal 57 may be 18,000 volts, for example, the potential of terminal 58 may be only half that. It is desirable where the device is being used as an oscilloscope to materially reduce the voltage applied to the anode since the beam is moving over a smaller portion of the screen 12. If the same anode voltage were employed as is employed when the video picture is being monitored, there would be some tendency for the beam to burn the electroluminescent coating of screen 12. Furthermore, due to the high voltage applied to the beam, it takes more deflecting force to move it and the deflecting force available with electrostatic plates is more limited. By reducing the anode voltage at the same time as the tube is switched to perform the oscilloscope function, the danger of such burning occurring is eliminated and the deflection sensitivity of the tube is increased.

The movement of contact member 85 into engagement with contact 86 results in a circuit being established, as indicated in FIGURE 1, from a suitable source of power such as a battery 87, having one terminal connected to ground at 88, through fixed contact 86, movable contact 85, and conductor 89 to one terminal of the electric lamps 34, the other terminals of which are grounded. The effect of this, as shown in FIGURE 3, is to illuminate the panel 33. As will be noted in FIGURE 3, there are a plurality of score lines 101 which may have percentage calibrations to indicate the percentage of total video signal that is occupied by the picture information, the synchronizing signals and the black setup. As pointed out above, a luminescent coating is preferably employed which gives a white light upon being subjected to a cathode ray beam. Inasmuch as oscilloscopes commonly employ a coating which gives a green light when illuminated, I contemplate for psychological reasons, providing for the electric lamps 34 to give a green light so that the panel 33 gives a greenish appearance to the presentation.

I have found that the wave form display obtained with an apparatus such as I have described is extremely satisfactory despite the fact that the same tube is being used for both the video picture monitoring and for the monitoring of the wave form. By utilizing the same tube 10 and many of the circuit components connected therewith for both functions, it is possible to greatly reduce the cost of the monitoring equipment.

*Modification of FIGURE 4*

The modification of FIGURE 4 is the same in all respects as that of FIGURE 1 with the exception that instead of the horizontal deflection coils 19 and 20 being used during the oscilloscope phase of the operation, I provide separate horizontal electrostatic deflection plates 90 and 92 which have the voltage from sweep oscillator 65 applied to them.

In order to enable a comparison of FIGURE 1 and FIGURE 4, I have used the same reference characters in connection with FIGURE 4 where the components are identical to those of FIGURE 1. Thus it will be noted that the switch structure comprises movable switch members 48 and 51 which engage with contacts 49 and 52, respectively. In addition, I provide a further switch 95 having a movable switch blade 96 adapted to engage a fixed contact 97 when the switches are moved to the position in which switch blades 48 and 51 are disengaged from contacts 49 and 52. The engagement of movable switch member 96 with fixed contact 97 causes a circuit to be established from the output of sweep oscillator 65 through a conductor 98, contacts 97 and 96 and conductor 99 to the electrostatic horizontal deflection plate 90. Again, it is to be understood that the other horizontal deflection plate 92 is connected to a source of potential such that the horizontal sweep oscillator voltage will appear between plates 90 and 92. The operation of FIGURE 4 will be evident, instead of the beam being deflected horizontally by reason of the sweep voltage being applied to the electromagnetic horizontal sweep coils 19 and 20, the beam will be deflected by reason of the sweep voltage being applied to the horizontal electrostatic deflection plates 90 and 92. The appearance of the signal on the screen as shown in FIGURE 3 will be basically the same.

The only advantage of using electrostatic deflection plates instead of the electromagnetic coils 19 and 20 is that, particularly, when the video picture signal is being observed, a higher frequency sweep voltage may be desirable and the response of the horizontal electrostatic plates will be somewhat better at these higher frequencies than the electromagnetic horizontal deflection coils 19 and 20.

*Conclusion*

It will be seen that I have provided television monitoring apparatus in which a single cathode ray tube is used both as a kinescope to monitor the picture information and as an oscilloscope to monitor the wave form of the video signal. In doing this, I have been able to utilize many of the auxiliary components in connection with the tube when it is used in both manners. Thus, it is possible to secure accurate monitoring both of the picture information and of the wave form and very substantial reduction in the overall costs of the apparatus as compared with one in which separate tubes are used to function as the kinescope and the oscilloscope.

While I have shown certain specific embodiments of my invention, it is to be understood that this is for purposes of illustration only and that my invention is limited in scope solely by the appended claims.

I claim as my invention:

1. Television monitoring apparatus comprising a cathode ray tube comprising a screen,
means for producing a cathode ray beam adapted to impinge upon said screen,
control means for intensity modulating said beam,
horizontal deflection means for deflecting said beam horizontally with respect to said screen,
vertical deflection means for deflecting said beam vertically with respect to said screen,
a source of video signal comprising video information and horizontal and vertical synchronizing pulses,
means for deriving from said source of video signal a video signal voltage varying in magnitude with the video signal, a horizontal deflection voltage derived from the horizontal synchronizing pulses, and a vertical deflection voltage derived from the vertical synchronizing pulses,
a source of voltage of predetermined frequency,
switching means having a first picture monitoring position and a second wave form monitoring position,
and circuit connections including said switching means effective
when said switching means is in said first picture monitoring position to apply said video signal signal voltage to said control means for intensity modulating said beam, said horizontal deflection voltage to said horizontal deflection means, and said vertical deflection voltage to said vertical deflection means, and
when said switching means is in said second wave form monitoring position to connect said source of voltage of predetermined frequency to said horizontal deflection means and said video signal voltage to said vertical deflection means.

2. The apparatus of claim 1 in which a transparent panel having normally relatively invisible scale lines thereon is located in front of the screen and in which, upon said switching means being moved to said second wave form monitoring position, the scale lines on said panel are rendered visible.

3. Television monitoring apparatus comprising a cathode ray tube comprising a screen,
means for producing a cathode ray beam adapted to impinge upon said screen,
control means for intensity modulating said beam,
horizontal deflection means for deflecting said beam horizontally with respect to said screen,
electromagnetic vertical deflection means for deflecting said beam vertically with respect to said screen,
electrostatic vertical deflection means for also deflecting said beam vertically with respect to said screen,
a source of video signal comprising video information and horizontal and vertical synchronizing pluses,
means for deriving from said source of video signal a video signal voltage varying in magnitude with the video signal, a horizontal deflection voltage derived from the horizontal synchronizing pluses, and a vertical deflection voltage derived from the vertical synchronizing pulses,
a source of voltage of predetermined frequency,
switching means having a first picture monitoring position and a second wave form monitoring position,
and circuit connections including said switching means effective
when said switching means is in said first picture monitoring position to apply said video signal voltage to said control means for intensity modulating said beam, said horizontal deflection voltage to said horizontal deflection means, and said vertical deflection voltage to said electromagnetic vertical deflection means, and
when said switching means is in said second wave form monitoring position to connect said source of voltage of adustable frequency to said horizontal deflection means and said video signal voltage to said electrostatic vertical deflection means.

4. The apparatus of claim 3 in which the electrostatic vertical deflection means is located a further distance from the screen than said electromagnetic vertical deflection means.

5. Television monitoring apparatus comprising a cathode ray tube comprising a screen,
means for producing a cathode ray beam adapted to impinge upon said screen,
control means for intensity modulating said beam,
horizontal and vertical electromagnetic deflection means for deflecting said beam horizontally and vertieally, respectively, with respect to said screen,
horizontal and vertical electrostatic deflection means for deflecting said beam horizontally and vertically, respectively, with respect to said screen,
a source of video signal comprising video information and horizontal and vertical synchronizing pulses,
means for deriving from said source of video signal a signal voltage varying in magnitude with the video signal, a horizontal deflection voltage derived from the horizontal synchronizing pluses, and a vertical deflection voltage derived from the vertical synchronizing pluses,
a source of voltage of adjustable frequency,
switching means having a first picture monitoring position and a second wave form monitoring position,
and circuit connections including said switching means effective
when said switching means is in said first picture monitoring position to apply said video signal voltage to said control means for intensity modulating said beam, said horizontal deflection voltage to said horizontal electromagnetic deflection means, and said vertical deflection voltage to said vertical electromagnetic deflection means, and
when said switching means is in said second wave form monitoring position to connect said source of voltage of adjustable frequency to said horizontal electrostatic deflection means and said video signal voltage to said vertical electrostatic deflection means.

6. Television monitoring apparatus comprising a cathode ray tube comprising a screen,
means for producing a cathode ray beam adapted to impinge upon said screen,
control means for intensity modulating said beam,
horizontal deflection means for deflecting said beam horizontally with respect to said screen,
electromagnetic vertical deflection means for deflecting said beam vertically with respect to said screen,
electrostatic vertical deflection plates for also deflecting said beam vertically with respect to said screen,
a source of video signal comprising video information and horizontal and vertical synchronizing pulses,
means for deriving from said source of video signal a video signal voltage varying in magnitude with the video signal, a horizontal deflection voltage derived from the horizontal synchronizing pulses, and a vertical deflection voltage derived from the vertical synchronizing pulses,
a source of voltage of predetermined frequency,
switching means having a first picture monitoring position and a second wave form monitoring position,
and circuit connections including said switching means effective
when said switching means is in said first picture monitoring position to apply said video signal voltage to said control means for intensity modulating said beam, said horizontal deflection voltage to said horizontal deflection means, and said vertical deflection voltage to said electromagnetic vertical deflection means, and
when said switching means is in said second wave form monitoring position to connect said source of voltage of adjustable frequency to said horizontal deflection means and a voltage to be analyzed to said electrostatic vertical deflection plates.

7. Television monitoring apparatus comprising a cathode ray tube comprising a screen,
cathode means for producing a cathode ray beam adapted to impinge upon said screen,
a source of screen voltage for applying a voltage between said screen and said cathode means,
control means for intensity modulating said beam,
horizontal deflection means for deflecting said beam horizontally with respect to said screen,
vertical deflection means for deflecting said beam vertically with respect to said screen,
a source of video signal comprising video information and horizontal and vertical synchronizing pulses,
means for deriving from said source of video signal a video signal voltage varying in magnitude with the video signal, a horizontal deflection voltage derived from the horizontal synchronizing pulses, and a vertical deflection voltage derived from the vertical synchronizing pulses,
a source of voltage of predetermined frequency,
switching means having a first picture monitoring position and a second wave form monitoring position,
and circuit connections including said switching means effective
when said switching means is in said first picture monitoring position to apply said video signal voltage to said control means for intensity modulating said beam, said horizontal deflection voltage to said horizontal deflection means, said vertical deflection voltage to said vertical deflection means, and a maximum voltage from said source of screen voltage between said screen and said cathode means, and
when said switching means is in said second wave form monitoring position to connect said source of voltage of predetermined frequency to said horizontal deflection means, a voltage to be analyzed to said vertical deflection means, and a lesser voltage from said source of screen voltage between said screen and said cathode means.

8. Television monitoring apparatus comprising a cathode ray tube comprising a screen,
means for producing a cathode ray beam adapted to impinge upon said screen,
control means for intensity modulating said beam,
horizontal and vertical electromagnetic deflection means for deflecting said beam horizontally and vertically, respectively, with respect to said screen,
horizontal and vertical electrostatic deflection plates for deflecting said beam horizontally and vertically, respectively, with respect to said screen,
said electrostatic deflection plates being located immediately adjacent to said electromagnetic deflection means but further from said screen than said electromagnetic deflection means,
a source of video signal comprising video information and horizontal and vertical synchronizing pulses,
means for deriving from said sourc of video signal a video signal voltage varying in magnitude with the video signal, a horizontal deflection voltage derived from the horizontal synchronizing pulses, and a vertical deflection voltage derived from the vertical synchronizing pulses,
a source of voltage of adjustable frequency,
switching means having a first picture monitoring position and a second wave form monitoring position,
and circuit connections including said switching means effective
when said switching means is in said first picture monitoring position to apply said video signal voltage to said control means for intensity modulating said beam, said horizontal deflection voltage to said horizontal electromagnetic deflection means, and said vertical deflection voltage to said vertical electromagnetic deflection means, and when said switching means is in said second wave form monitoring position to connect said source of voltage of adjustable frequency to said horizontal electrostatic deflection plates and said voltage to be analyzed to said vertical electrostatic deflection plates.

References Cited

UNITED STATES PATENTS 2,284,219 5/1942 Loughren ------------- 178—6

FOREIGN PATENTS 124,525 3/1960 Russia.

OTHER REFERENCES

Southworth: "Use Your TV Set as an Oscilloscope," Radio and TV News, pp. 66–67, 158, April 1958.

JOHN W. CALDWELL, *Acting Primary Examiner.*

R. L. RICHARDSON, *Assistant Examiner.*